(12) United States Patent
Onose

(10) Patent No.: US 10,063,745 B2
(45) Date of Patent: Aug. 28, 2018

(54) INFORMATION PROCESSING SYSTEM, INFORMATION PROCESSING APPARATUS, AND INFORMATION PROCESSING METHOD

(71) Applicant: Hiroshi Onose, Kanagawa (JP)

(72) Inventor: Hiroshi Onose, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 20 days.

(21) Appl. No.: 15/333,727

(22) Filed: Oct. 25, 2016

(65) Prior Publication Data

US 2017/0134615 A1   May 11, 2017

(30) Foreign Application Priority Data

Nov. 9, 2015   (JP) .................................. 2015-219574

(51) Int. Cl.
  *G06F 15/00* (2006.01)
  *H04N 1/44* (2006.01)
  (Continued)

(52) U.S. Cl.
  CPC ....... *H04N 1/4413* (2013.01); *H04N 1/00212* (2013.01); *H04N 1/00233* (2013.01);
  (Continued)

(58) Field of Classification Search
  CPC ............. H04N 1/4413; H04N 1/00212; H04N 1/00233; H04N 1/00344; H04N 1/32117; H04N 1/4426
  (Continued)

(56) References Cited

U.S. PATENT DOCUMENTS

2014/0366104 A1*  12/2014  Nishida ................. G06F 21/608
                                                                    726/5
2015/0212761 A1    7/2015  Onose
                        (Continued)

FOREIGN PATENT DOCUMENTS

JP    2014-219892    11/2014
JP    2015-018404     1/2015

*Primary Examiner* — Mark R Milia
(74) *Attorney, Agent, or Firm* — Harness, Dickey & Pierce P.L.C.

(57) ABSTRACT

An information processing system includes a first information processing apparatus and a second information processing apparatus. The first information processing apparatus includes first circuitry that registers job information and a first transmitter that transfers job identification information respectively to a transmission source of the job information and a predetermined destination, and further transfers address information indicating an address of the transmission source of the job information to the predetermined destination. The second information processing apparatus includes a receiver that receives, from the first information processing apparatus, the job identification information and the address information, second circuitry that acquires, from a memory, user identification information corresponding to the address indicated by the address information, the user association information, and registers the received job identification information, and a second transmitter that transfers a request for transmission and provides at least a part of the registered job to a source of the inquiry.

20 Claims, 5 Drawing Sheets

(51) Int. Cl.
  *H04N 1/00* (2006.01)
  *H04N 1/32* (2006.01)
(52) U.S. Cl.
  CPC ..... *H04N 1/00344* (2013.01); *H04N 1/32117* (2013.01); *H04N 1/4426* (2013.01)
(58) Field of Classification Search
  USPC ........................................................ 358/1.14
  See application file for complete search history.

(56) References Cited

U.S. PATENT DOCUMENTS

2015/0355873 A1\* 12/2015 Choi .................... G06F 3/1204
                                                            358/1.15
2016/0098233 A1   4/2016 Nishida \* cited by examiner

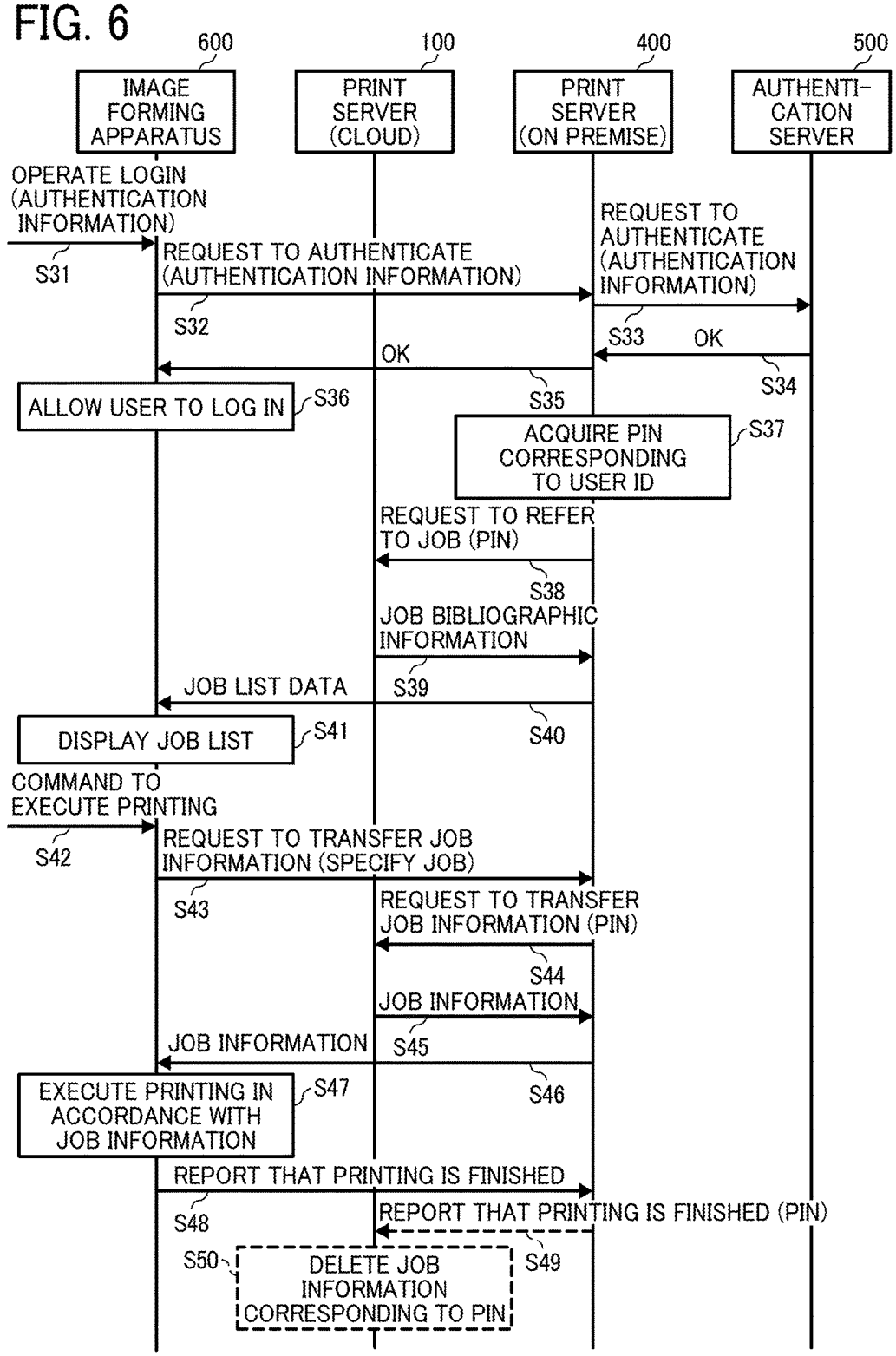

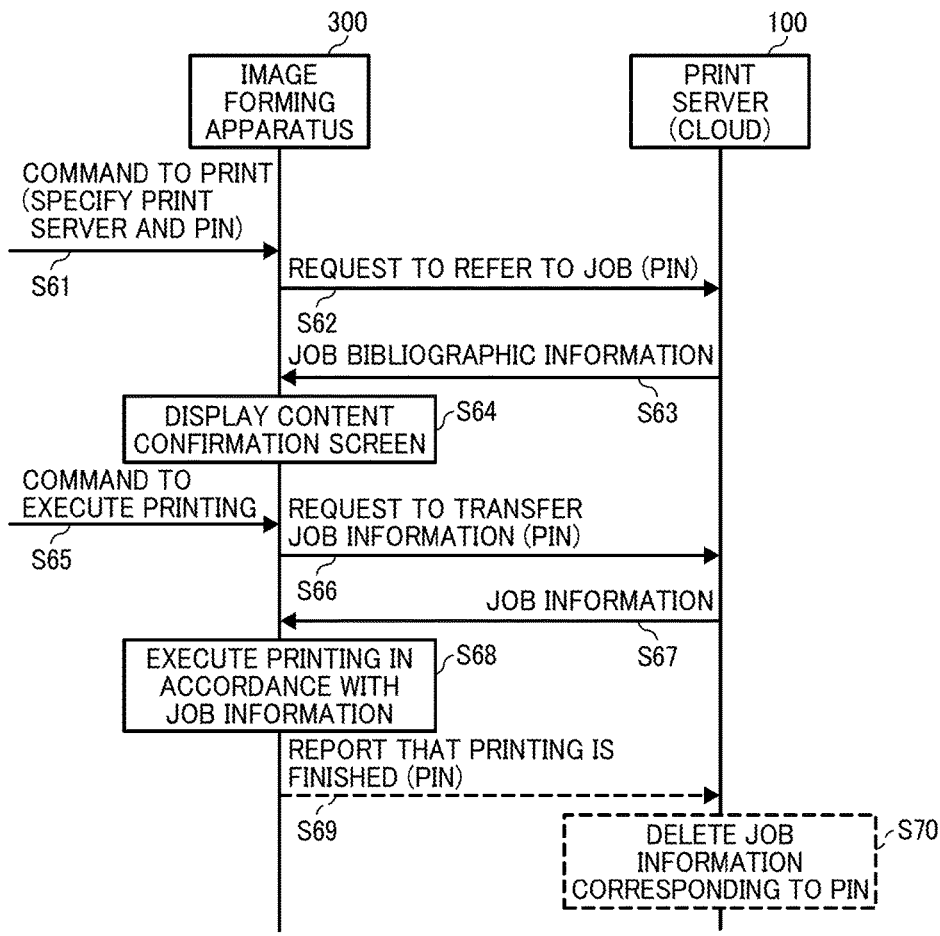

ID: 2015-219574
INFORMATION PROCESSING SYSTEM, INFORMATION PROCESSING APPARATUS, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2015-219574, filed on Nov. 9, 2015 in the Japan Patent Office, the entire disclosure of which is hereby incorporated by reference herein.

BACKGROUND

Technical Field

The present invention relates to an information processing system, an information processing apparatus, and an information processing method.

Background Art

A technology is known, which transfers information from a user terminal to a server on a cloud environment to register the information in the server for use by other apparatuses. For example, after a print job is registered in a print server on the cloud environment, a printer accesses the print server to perform printing in accordance with the registered print job. The printing via the print server as described above may be performed using a printer located in a local environment such as an office and a university etc.

In a local environment, users of the printer are often limited to preregistered users, and available functions and the number of printable sheets are often limited as well. Similarly, printing may be restricted even with the print server on the cloud environment.

SUMMARY

Example embodiments of the present invention provide a novel information processing system that includes a first information processing apparatus provided on a first network and a second information processing apparatus provided on a second network. The first information processing apparatus includes first circuitry that registers, in response to receiving job information that controls an apparatus to perform a specific operation, the job information associated with job identification information identifying the job and a first transmitter that transfers the job identification information respectively to a transmission source of the job information and a predetermined destination that is previously associated with an address of the transmission source, and further transfers address information indicating the address of the transmission source of the job information to the predetermined destination. The second information processing apparatus, being the predetermined destination, includes a receiver that receives, from the first information processing apparatus, the job identification information identifying the job information and the address information indicating the address of the transmission source of the job information associated with the job identification information, second circuitry that acquires, from a memory storing user association information, user identification information corresponding to the address indicated by the address information received by the receiver, the user association information associating for each user an address and user identification information, and registers the job identification information received by the receiver associated with the acquired user identification information, and a second transmitter that transfers, in response to an inquiry with the user identification information from a source of inquiry, a request for transmission including the job identification information that is registered, to the first information processing apparatus to cause the first information processing apparatus to transfer the job information registered at the first information processing apparatus in association with the job identification information and provides at least a part of the job information registered in association with the job identification information that is received from the first information processing apparatus, to a source of the inquiry.

Further example embodiments of the present invention provide an information processing apparatus and an information processing method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 6 is a diagram illustrating operation of printing in accordance with the job information registered in the operation of FIG. 5 using the image forming apparatus in the local environment, performed by the system of FIG. 1, according to an embodiment;

FIG. 7 is a diagram illustrating operation of printing in accordance with the job information registered in the operation of FIG. 5 using the image forming apparatus outside the local environment, performed by the system of FIG. 1, according to an embodiment; and FIG. 8 is a diagram illustrating a job list screen as an embodiment of the present invention.

Figure 1:
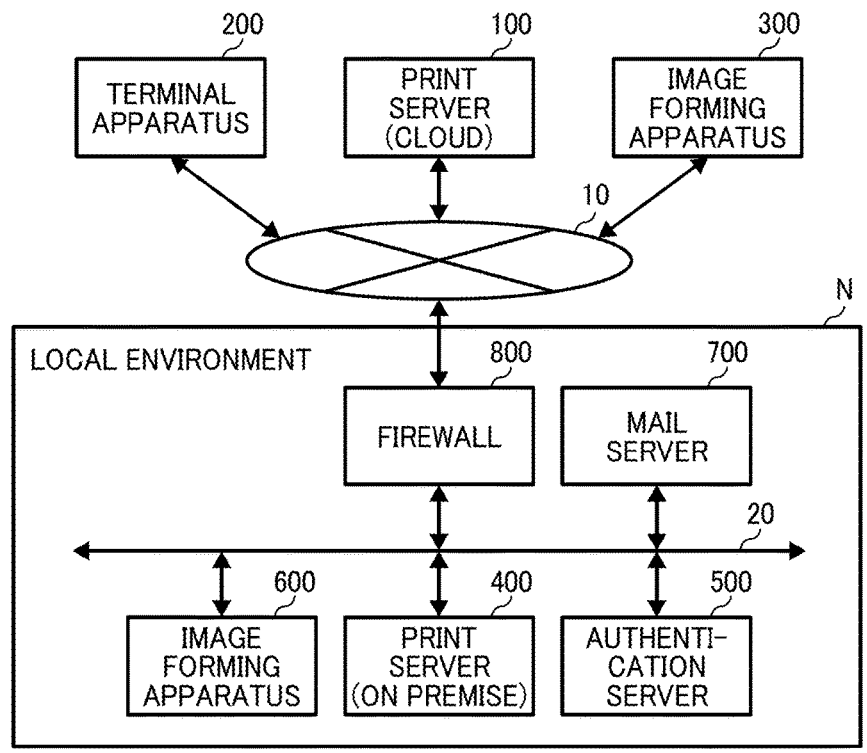
FIG. 1 is a diagram illustrating a schematic configuration of a system including a print server as an image forming apparatus as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

Generally, systems authenticating users who utilize a printer are different between the local environment and the cloud environment.

For example, regarding the print server in the cloud environment, a system that does not require user registration preliminarily. By contrast, in the local environment, it is widely implemented to allow only preregistered users to print.

As a result, especially, in case of not requiring to register users in the print server in the cloud environment, it is difficult to cooperate with an authentication platform in the local environment, and users are required to perform complicated operations in performing printing by the printer in the local environment using the print server.

For example, after inputting authentication information used in the local environment to be authorized as the user to confirm user privilege of using a printer, it is also required to authenticate privilege of executing a job in the cloud environment by inputting authentication information corresponding to the print job.

It should be noted that the same kind of problem may occur in executing jobs other than printing. Not always depending on environments where apparatuses are located, that issue may occur in case of cooperating systems with different authentication platforms.

A schematic configuration of a system including a print server as an image forming apparatus in this embodiment is illustrated in FIG. 1.

In FIG. 1, the system includes a (cloud) print server 100, a terminal apparatus 200, an image forming apparatus 300, a (local) print server 400, an authentication server 500, an image forming apparatus 600, an e-mail server 700, and a firewall 800.

Among these apparatus, the print server 100 is an example of the information processing apparatus in this embodiment, which manages job information to be performed by various image forming apparatuses such as the image forming apparatuses 300 and 600. The print server 100 is located in a so-called cloud environment that may be accessed by apparatuses located in various environments via the Internet 10. The print server 100 at least accepts access from the terminal apparatus 200, the image forming apparatus 300, and the print server 400. As described later, information on the print server 400 located in a local environment N is registered in the print server 100. However, it is not always required that the print server 100 is installed and managed by an administrator of the local environment N. The print server 100 may be shared by multiple local environments.

The terminal apparatus 200 and the image forming apparatus 300 are capable of communicating with each other via the Internet 10. However, it is unnecessary that the same administrator as the print server 100 manages the terminal apparatus 200 and the image forming apparatus 300. In this embodiment, the terminal apparatus 200 is a mobile information processing apparatus such as a smartphone, tablet computer, and notebook personal computer (PC) etc. personally owned by a user. Alternatively, the similar functions as described below may be implemented by using non-portable information processing apparatuses such as a desktop PC etc. In addition, the terminal apparatus may be shared by multiple users or available to the public.

In this embodiment, the image forming apparatus 300 is assumed to be an apparatus capable of forming an image on a recording medium such as paper to print out, which may be located at a facility such as a store etc. to be available to the public. However, similar functions as described below may be implemented even in case of an apparatus made available to only a specific user that is provided at a location such as a user home.

By contrast, the printer server 400, the authentication server 500, the image forming apparatus 600, and the e-mail server 700 are located inside the local environment N provided with the firewall 800 that restricts access from outside, and are connected with each other via a local area network (LAN) 20. Examples of the local environment N include a network configured inside a corporation, a university, or a specific facility, as managed by a specific administrator.

Among these apparatuses, the print server 400 is an example of the information processing apparatus, which is different from the print server 100 in this embodiment. The print server 400 manages job information to be performed by the image forming apparatus 600 inside the local environment N. That is, the print server 400 basically manages on-premise printing. In addition, the print server 400 acquires job information from the print server 100 in the cloud environment to provide the job information to the image forming apparatus 600 and manages data for acquiring the job information. Functions of the print server 400 are described later in detail with reference to FIG. 3.

The authentication server 500 manages authentication information for authenticating users in the local environment N, and with this authentication information, authenticates users in response to requests from other apparatuses. Examples of the authentication information include a user ID and a password. Other information such as biometric information etc. may also be used. The authentication server 500 also has a function of managing personal information of users in addition to the authentication information described above. In this embodiment, the authentication server 500 at least manages e-mail addresses of the users. In this case, it is assumed that the e-mail addresses are issued by the administrator who manages the local environment N, and have domain names that are common to all users in the same local environment N. However, the e-mail addresses may be issued or have format different than this described case.

Just like the image forming apparatus 300, the image forming apparatus 600 includes a function of forming an image on a recording medium such as paper to perform printing. It should be noted that the image forming apparatus 600 is configured to be used by users authenticated by the authentication server 500 only. After accepting input of authentication information by a user who wants to use the image forming apparatus 600, the image forming apparatus 600 allows the user to use the image forming apparatus 600 if the authentication server 500 authenticates the user based on the authentication information.

The e-mail server 700 manages e-mail addressed to an e-mail address of the user, which is issued by the administrator who manages the local environment N. In addition, the e-mail server 700 transfers e-mail sent from the e-mail address of the user in the local environment N.

The firewall 800 monitors transmission of data between an apparatus in the local environment N and an external apparatus in other network, such that it blocks data unless such data is previously permitted for transmission. In this case, regarding active data transmission from outside to inside the local environment N, no transmission other than transferring e-mail is permitted.

The system described above corresponds to an information processing system including the print server 100 as a first information processing apparatus and the print server 400 as a second information processing apparatus.

Figure 2:
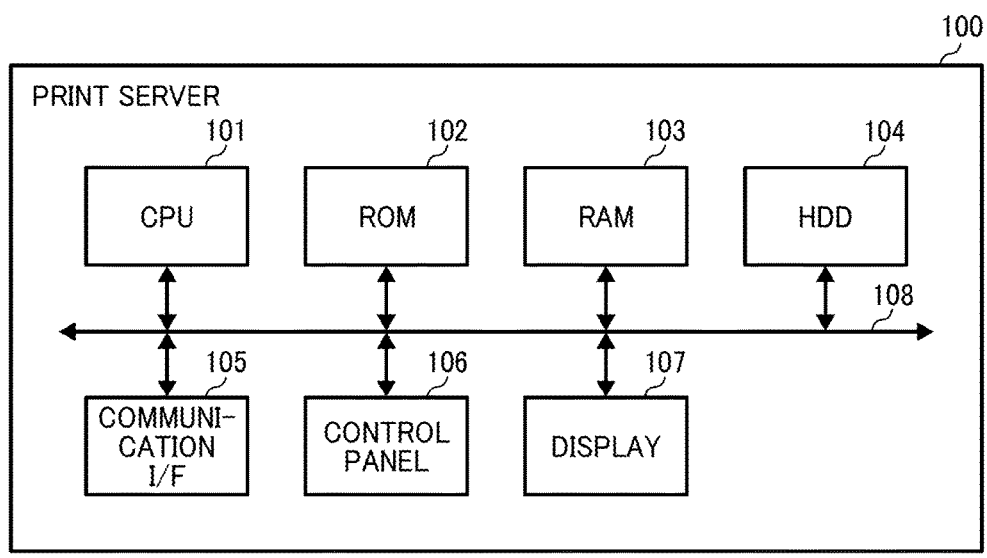
FIG. 2 is a diagram illustrating a hardware configuration of a print server in FIG. 1 as an embodiment of the present invention.

Next, FIG. 2 is a diagram illustrating a hardware configuration of the print server 100 in FIG. 1 in this embodiment.

As illustrated in FIG. 2, the print server 100 includes a central processing unit (CPU) 101, a read only memory (ROM) 102, a random access memory (RAM) 103, a hard disk drive (HDD) 104, a communication interface (I/F) 105, a control panel 106, and a display 107, and those components are connected with each other via a system bus 108.

The CPU 101 controls the entire print server 100 by executing a program stored in the ROM 102 using the RAM 103 as a work area, and various functions (including functions described with reference to FIG. 3) can be implemented.

The ROM 102 and the HDD 104 are non-volatile storage devices and store various programs executed by the CPU 101 and various data necessary for processing.

The communication I/F 105 is an interface that communicates with other apparatuses via the network N such as the Internet 10 etc. Other interfaces for communicating via a communication path other than the Internet 10 may also be implemented. Regardless of being wired or wireless, any protocol may be adopted for the communication described above.

The control panel 106 is an operational unit such as various keys, buttons, and a touch panel to accept user operation.

The display 107 displays various information, such as an operating status, a content of settings, and a message etc. of the print server 100 for notification to a user. For simplicity, the display 107 and the display unit, such as a liquid crystal display and a lamp etc., may be collectively referred to as the display 107.

It should be noted that the control panel 106 and the display 107 may be attached externally. It also should be noted that the control panel 106 and the display 107 can be omitted if the print sever 100 does not accept user operation directly (i.e., the print server 100 accepts user operation and displays information using an external apparatus connected via the communication I/F 105 in that case).

While it is unnecessary that specific function and performance do correspond between the print server 100 and the print server 400, the print server 400 includes hardware similar to the print server 100 as illustrated in FIG. 2. Similarly, the terminal apparatus 200, the authentication server 500, and the e-mail server 700 is provided with a controller having hardware as illustrated in FIG. 2. Regarding hardware of a controller, the image forming apparatuses 300 and 600 each have similar hardware as illustrated in FIG. 2. In addition to the controller having hardware of FIG. 2, the image forming apparatuses 300 and 600 each include hardware for forming an image on a recording medium such as a print engine etc.

The above-described system is able to easily perform printing both by using the image forming apparatus 300 available to the public and by using the image forming apparatus 600 in the local environment N, in accordance with the job information transferred from the terminal apparatus 200 to the print server 100 by user operation and registered in the print server 100. In addition, in performing printing using the image forming apparatus 600 in the local environment N, as long as the user is authenticated to use the image forming apparatus 600, the user is allowed to perform printing in accordance with the job information registered in the print server 100 without further authentication.

Functions and operations of each apparatus in the system of FIG. 1 are described below in detail.

Figure 3:
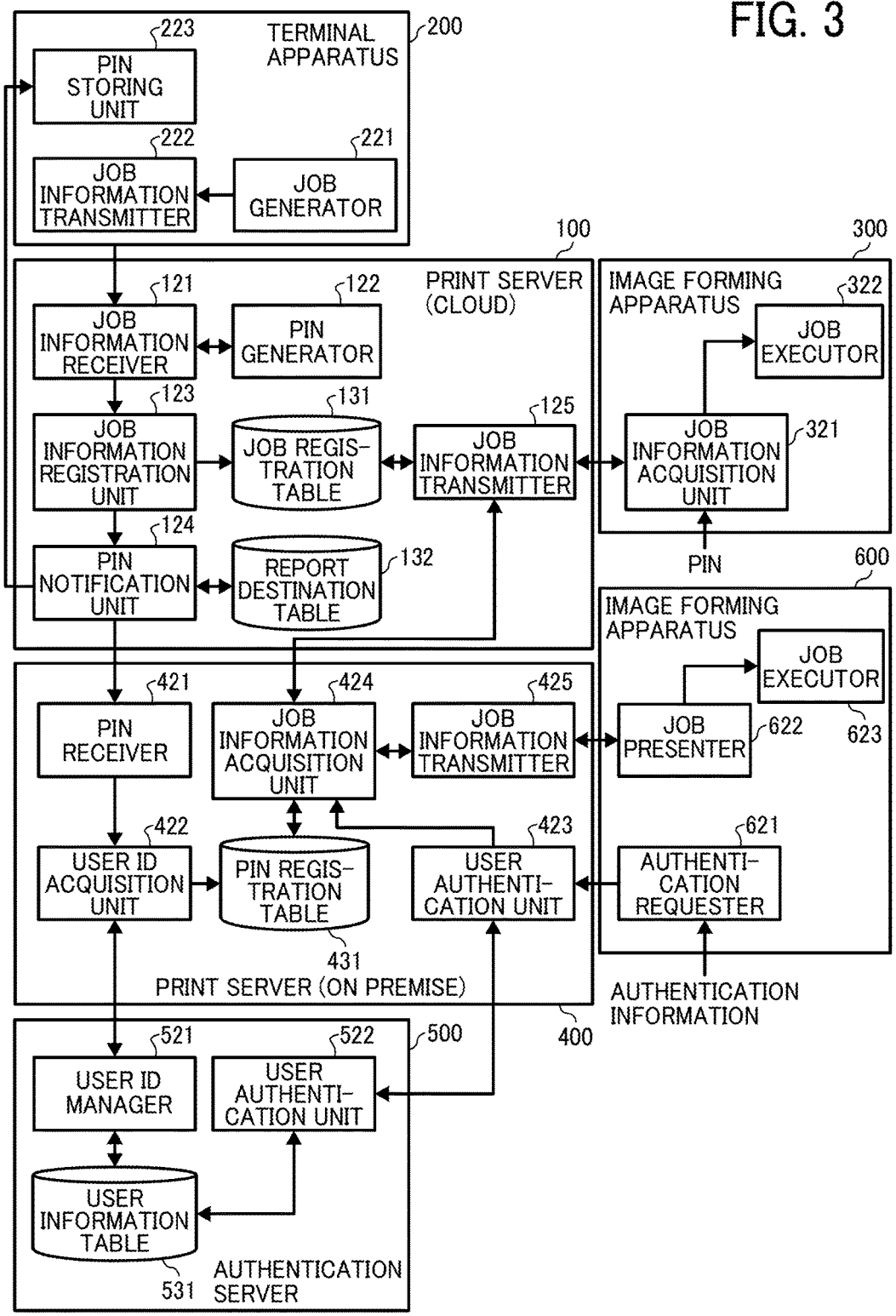
FIG. 3 is a diagram illustrating a functional configuration of the system of FIG. 1, which relates to registration of job information in the print server and controlling printing by the image forming apparatuses 300 and 600 in accordance with the job information, according to an embodiment.

First, FIG. 3 is a diagram illustrating a functional configuration of the system of FIG. 1, which relates to registration of job information in the print server and controlling printing by the image forming apparatuses 300 and 600 in accordance with the job information, according to an embodiment. In FIG. 3, a function for authenticating a user who uses the image forming apparatus 600 is illustrated, which is implemented in accordance with a request from the administrator of the local environment N.

As illustrated in FIG. 3, the print server 100 includes a job information acceptance unit 121, a PIN generator 122, a job information registration unit 123, a PIN reporter 124, and a job information transmitter 125.

Among these components, the job information acceptance unit 121 accepts job information (i.e., a print job in this case) indicating contents to be printed by the image forming apparatus transferred by the terminal apparatus 200. In this embodiment, the job information is transferred to a specific address using e-mail, and the job information acceptance unit 121 identifies a source user using a source address of the e-mail. However, it is unnecessary to identify a source apparatus that transfers the e-mail.

In addition, in accepting the job information, the job information acceptance unit 121 requests the PIN generator 122 to generate a PIN as job identification information for identifying the job information associated with the job information and passes the PIN to the job information registration unit 123 along with the job information.

After receiving the job information from the job information acceptance unit 121, the job information registration unit 123 performs a rendering operation if required to convert the job information into data whose format is compatible to the image forming apparatus and registers the data in the job registration table 131 associated with the PIN. If the rendering operation is performed by the terminal apparatus 200, it is unnecessary that the print server 100 performs the rendering operation, and the rendering operation has low relevance to the operations in this embodiment. Therefore, in this embodiment, the information indicating the contents to be printed by the image forming apparatus is referred to as "job information" regardless of before the rendering operation and after the rendering operation.

As illustrated in Table 1, in the job registration table 131, the arbitrary number of job information are registered associated with the PIN respectively. It should be noted that the job information includes bibliographic information such as information on the source user, a file name to be printed, and the number of pages etc., image data to be printed (in case of after performing the rendering process), and setting information used by the image forming apparatus that performs printing etc.

TABLE 1

| PIN | Contents of job |
| --- | --- |
| 12345 | Bibliographic information A, image data A, and setting information A |
| 67891 | Bibliographic information B, image data B, and setting information B |
| . | . |
| . | . |
| . | . |
| 34567 | Bibliographic information X, image data X, and setting information X |

The PIN generator 122 includes the function of generating PIN described above. The PIN is generated so that the PIN does not overlap with any PIN registered in the job registration table 131. In addition, preferably, the PIN is generated as random data so that the PIN corresponding to the registered job data may not be easily estimated.

The PIN reporter 124 transfers the PIN registered in the job registration table 131 by the job information registration unit 123 to a predetermined destination (i.e., e-mail address used by the print server 400 in this case) registered in the report destination table 132 associated with the source of the job information and the source e-mail address of the job information. The source e-mail address of the job information is also transferred to the predetermined destination described above.

Here, Table 2 illustrates the report destination table 132.

TABLE 2

| Domain | Destination e-mail address |
| --- | --- |
| univ-a.ac.jp | printserver@univ-a.ac.jp |
| univ-b.ac.jp | printserver@univ-b.ac.jp |
| . | . |
| . | . |
| . | . |

In the report destination table 132, a domain name included in the source e-mail address of the job information and the e-mail address of the predetermined e-mail address are registered associated with each other. That is, if the job information is transferred from an e-mail address in a specific domain, it is registered that a PIN corresponding to the job information is transferred to a preregistered destination regarding the domain. As described above, the e-mail address of the print server 400 in the local environment N is used as the destination.

In this case, for example, since it is considered that a user who uses an e-mail address with a domain name indicating a specific organization issued by the organization such as a specific corporation and university etc. uses an image forming apparatus in a local environment of the organization, it is intended that the PIN is reported to the print server 400 that manages printing using the image forming apparatus in the local environment of that organization. In addition, less effort is required for the registration by not registering individual user but registering a domain name only.

If an organization has multiple local environments, it is also possible that multiple e-mail addresses are registered associated with the domain name of the organization and the PIN is reported to all of the multiple e-mail addresses. This notification is to the organization that the user is supposed to belong. Therefore, if the PIN that has already transferred is deleted in the local environment on regular basis, it is not a problem to report the PIN not to be used itself.

Figure 4:
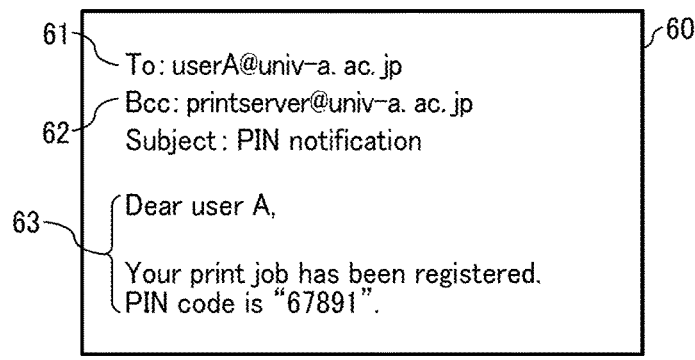
FIG. 4 is a diagram illustrating an example e-mail used for reporting PIN.

As described above, the transmission by the PIN reporter 124 with reference to the report destination table 132 may be performed by transferring e-mail 60 illustrated in FIG. 4 for example. In the e-mail 60, the source e-mail address of the job information is described in a To field 61, the destination e-mail address acquired from the report destination table 132 is described in a Bcc field 62, and text reporting the PIN code is described in a main body 63. In the main body, it is possible to include information to help specifying job information by the user such as a file name of the document to be printed etc.

The destination in the To field is the address of the user who transferred the job information, and the user may grasp the PIN with reference to the e-mail 60 using e-mail application software. By contrast, the e-mail address of the print server 400 described in the Bcc field is never known to the user. However, for example, in case of reporting to the user that the document is also printable in the local environment N, if it is reported that the document is transferred to the print server 400, it is possible to describe the predetermined destination e-mail address in the Cc field or the To field.

In addition, by receiving the e-mail 60 using the PIN receiver 421 and analyzing the e-mail 60, in addition to the PIN written in a specific part in the main body, the print server 400 may acquire the e-mail address of the user who registered the job information described in the To destination.

In response to the request to transfer specifying the PIN, the job information transmitter 125 functions as a job transmitter that transfers a part of the job information or all of the job information registered in the job registration table 131 associated with the PIN to the source of the request. Here, in this case, in addition to the request to transfer job information that requests to transfer the whole job information, the job information transmitter 125 may support a request to refer a job that requests to transfer job bibliographic information used for displaying and checking a job list.

Next, the terminal apparatus 200 includes a job generator 221, a job information transmitter 222, and a PIN storing unit 223.

Among the components described above, the job generator 221 generates job information to be transferred to the print server 100 and registered in the print server 100 in accordance with user instruction. For example, the instruction described above specifies a document file to be printed, print settings used for printing, and the print server 100 as the destination and requests to transfer the information.

The job information transmitter 222 transfers the job information generated by the job generator 221 to the print server 100 as the specified destination. In this case, the transfer is performed by describing the e-mail address of the print server 100 as the destination and transferring e-mail attached the job information file. Especially, it is unnecessary to describe a command to request to register. The e-mail address of the print server 100 may be registered in the job information transmitter 222 preliminarily. Otherwise, it is possible to accept inputting the e-mail address of the print server 100 by user operation.

The PIN storing unit 223 acquires the PIN transferred by the print server 100 in accordance with the transmission of the job information by the job information transmitter 222 and stores the PIN so that the user may refer to the PIN in the future. In this embodiment, as described before with reference to FIG. 4, the PIN is transferred using e-mail. Therefore, the PIN storing unit 223 at least needs to include a function of receiving the e-mail and storing the e-mail. The function may be implemented by using a known application for transferring and receiving e-mail.

Next, the image forming apparatus 300 includes a job information acquisition unit 321 and a job executor 322.

Among the components described above, the job information acquisition unit 321 accepts inputting PIN corresponding to job information indicating contents to be performed printing and information on the print server 100 that the job information is registered. In addition, based on the information described above, the job information acquisition unit 321 acquires job information corresponding to the PIN input by the print server 100. In this embodiment, first, the job information acquisition unit 321 acquires bibliographic information in the job information, presents the bibliographic information to the user, accepts confirmation of printing from the user who browses the bibliographic information, and acquires the whole job information.

The job executor 322 executes printing based on the job information acquired by the job information acquisition unit 321.

By using functions implemented by the components described above, as the user inputs the PIN stored in the PIN storing unit 223 of the terminal apparatus 200 into the image forming apparatus 300 and selects the print server 100 as the destination for storing the job information, the image forming apparatus 300 is caused to print based on the job information that has been transferred to the print server 100. In this case, it is unnecessary to input information to be used for authenticating an individual user at the image forming apparatus 300.

Next, the print server 400 includes a PIN receiver 421, a user ID acquisition unit 422, a user authentication unit 423, a job information acquisition unit 424, and a job information transmitter 425.

Among the components described above, the PIN receiver 421 regularly accesses the e-mail server 700 to receive e-mail transferred to the address of the print server 400. In addition, the PIN receiver 421 obtains e-mail (illustrated in FIG. 4) reporting PIN, which is transferred by the print server 100 among the received e-mail, and acquires from the obtained e-mail an e-mail address as a source of the PIN and the job information (i.e., an address written in To field).

The user ID acquisition unit 422 functions as an identification information acquisition unit that inquires the authentication server 500 to acquire a user ID corresponding to the e-mail address acquired by the PIN receiver 421. In addition, the user ID acquisition unit 422 functions as a registration unit that registers the PIN received by the PIN receiver 421 in the PIN registration table 431 associated with the user ID acquired from the authentication server 500. By performing the registration described above, the job information registered in the print server 100 is associated with the identification information for identifying the user who transfers the job information in the local environment N. In this embodiment, the print server 400 recognizes that the user who transfers the job information is authorized to execute the job regarding the job information. In addition, an address of the authentication server 500 is preset in the print server 400.

Table 3 illustrates an example of the PIN registration table 431. As illustrated in Table 3, in the PIN registration table 431, the PIN and user ID are associated with each other. If there is no user ID corresponding to the e-mail address, just like data corresponding PIN "34567" in Table 3, it is possible to register "NULL" as a user ID.

TABLE 3

| PIN | User ID |
|---|---|
| 12345 | User B |
| 67891 | User A |
| . | . |
| . | . |
| . | . |
| 34567 | NULL |

Here, as illustrated in Table 4, using a function of the user ID manager 521 as a manager, the authentication server 500 registers the user ID as identification information for identifying a user and a password as authentication information for authenticating the user in the user information table 531 to manage the information. The information described above is information for authenticating a user in the local environment N, and the information is registered by the administrator of the local environment N. In addition, in the user information table 531, as user's personal information, user's e-mail address is registered. In addition, it is possible to register a user name and information on usage authorization of the image forming apparatus 600 given to the user (such as available functions and printable number of sheets etc.).

TABLE 4

| User ID | Mail address | Password | ... |
|---|---|---|---|
| User B | userA@univ-a.ac.jp | passabc | ... |
| User A | userB@univ-a.ac.jp | passbcd | ... |
| . | . | . | . |
| . | . | . | . |
| . | . | . | . |

The user ID manager 521 searches through the user information table 531 in response to a request from the user ID acquisition unit 422 in the print server 400 and returns a user ID corresponding to the user's e-mail address.

Next, the user authentication unit 423 in the print server 400 accepts a request for authentication including the user ID and password from the image forming apparatus 600 and transfers the request for authentication including the user ID and password to the authentication server 500 to request to authenticate. In addition, the user authentication unit 423 returns an authentication result returned by the user authentication unit 522 in the authentication server 500 to the image forming apparatus 600 as the authentication result corresponding to the received request for authentication.

In accordance with the request for authentication including the user ID and password transferred by the user authentication unit 423 in the print server 400 etc., the user authentication unit 522 in the authentication server 500 checks the user ID and password with information in the user information table 531 to perform authentication. If the combination of the user ID and password included in the request for authentication is registered, it is authenticated that the user who inputs the information corresponds to the user who owns the user ID. If the combination of the user ID and password included in the request for authentication is not registered, it is determined that the authentication failed. Subsequently, the user authentication unit 522 returns the response to the source of the request for authentication.

If the user authentication succeeds, the user authentication unit 423 in the print server 400 passes the user ID of the authenticated user to the job information acquisition unit 424 to acquire the job information that the user registered in the print server 100.

The job information acquisition unit 424 acquires a PIN corresponding to the user ID of the authenticated user from the PIN registration table 431 and acquires the job information corresponding to the PIN from the print server 100. Here, the acquired job information described above is the job information registered in the print server 100 by the authenticated user. If the user registers multiple job information, multiple PINs corresponding to the user ID of the user are registered in the PIN registration table 431. Therefore, the job information acquisition unit 424 acquires multiple job information accordingly. The job information acquisition unit 424 functions as a job provider that provides the acquired job information to the image forming apparatus 600 as the source of the authentication request by transferring the job information via the job information transmitter 425. An address of the print server 100 is preset in the print server 400.

In this embodiment, the job information acquisition unit 424 first acquires bibliographic information as a part of the job information from the print server 100 and provides the bibliographic information to the image forming apparatus 600. Subsequently, after receiving a request to transfer the whole job information, the job information acquisition unit 424 anew transfers a request to transfer the job information including the PIN of the job information to the print server 100. After acquiring the whole job information, the job information acquisition unit 424 provides the whole job information to the image forming apparatus 600.

The job information transmitter 425 provides the job information acquired by the job information acquisition unit 424 or its bibliographic information to the image forming apparatus 600 and passes a request to transfer job information from the image forming apparatus 600 to the job information acquisition unit 424.

Next, the image forming apparatus 600 includes an authentication requester 621, a job presenter 622, and a job executor 623.

Among the components described above, the authenticator requester 621 accepts inputting a user ID and password by a user who wants to use the image forming apparatus 600 and transfers a request for authentication including that information to the user authentication unit 423 in the print server 400. An address of the print server 400 is preset in the image forming apparatus 600. If the authentication succeeds, the print server 400 automatically transfers the bibliographic information of the job information registered in the print server 100 by the authenticated user. As a result, it is possible to consider that the request for authentication also functions as an inquiry for job information specifying the corresponding user ID. In addition, the authentication requester 621 allows the operating user to log in and use the image forming apparatus 600 until the user logs out if the authentication succeeds.

Based on the bibliographic information of the job information provided by the print server 400, the job presenter 622 displays a job list currently printable registered in the print server 100 by the authenticated user and accepts a selection of a job to be executed. The job presenter 622 also transfers a request to transfer job information requesting to transfer the whole job information to the print server 400 and acquires the job information provided by the job information transmitter 425 in the print server in response to the request to transfer job information. In the request to transfer job information, if the PIN of each job information is acquired from the print server 400, it is possible to specify the PIN. Otherwise, it is possible to specify some sort of information that the print server 400 may specify the job information. For example, it is possible to specify an ID added to a job on the list.

The job executor 623 executes printing based on the job information acquired by the job presenter 622.

By using functions of the components described above, just by inputting the user ID and password into the image forming apparatus 600, being authenticated, and logging in the image forming apparatus 600 by user operation, it is possible to refer to the job information transferred to the print server 100 preliminarily, select a job, and command to print the job.

From the viewpoint of the administrator of the local environment N, in case of having a user utilize the print server 100 that does not use authentication information in the local environment N, the user who uses the image forming apparatus 600 may use the print server 100 after authenticating the user using the authentication information in the local environment N. Consequently, it is possible to manage functions available for users and the number of printable sheets in accordance with settings in the local environment N.

In addition, in this case, users are not burdened with inputting a PIN and address of the print server 100 in addition to the user ID and password. That is, by working the authentication using the PIN in the print server 100 with the authentication using the user ID and password, in accordance with one authentication operation, it is possible to display the job information registered in the print server 100 in the cloud environment by user operation on the image forming apparatus 600 in the local environment. As a result, it is possible to implement high operability.

This functions is implemented by acquiring the PIN and source e-mail address of the job information corresponding to the PIN from the print server 100, acquiring the user ID corresponding to the e-mail address based on the user information table 531 stored in the authentication server 500, and registering the acquired user ID associated with the PIN in the PIN registration table 431.

As a result, it is unnecessary to publish the user information table 531 managed by the authentication server 500 to the public in order to work the print server 400 with the print server 100. Consequently, it is possible to add the printing function using the print server 100 in the cloud environment to the system that performs printing using the print server 400 in the local environment N only. In addition, burden of maintaining the authentication platform in the local environment N does not increase.

Next, an operation of registering job information in the print server 100 and operations performed by each apparatus in performing printing using the job information is described below with reference to FIGS. 5 to 7. The operations performed by each apparatus are implemented by executing predetermined programs by the CPU in the apparatus.

Figure 5:
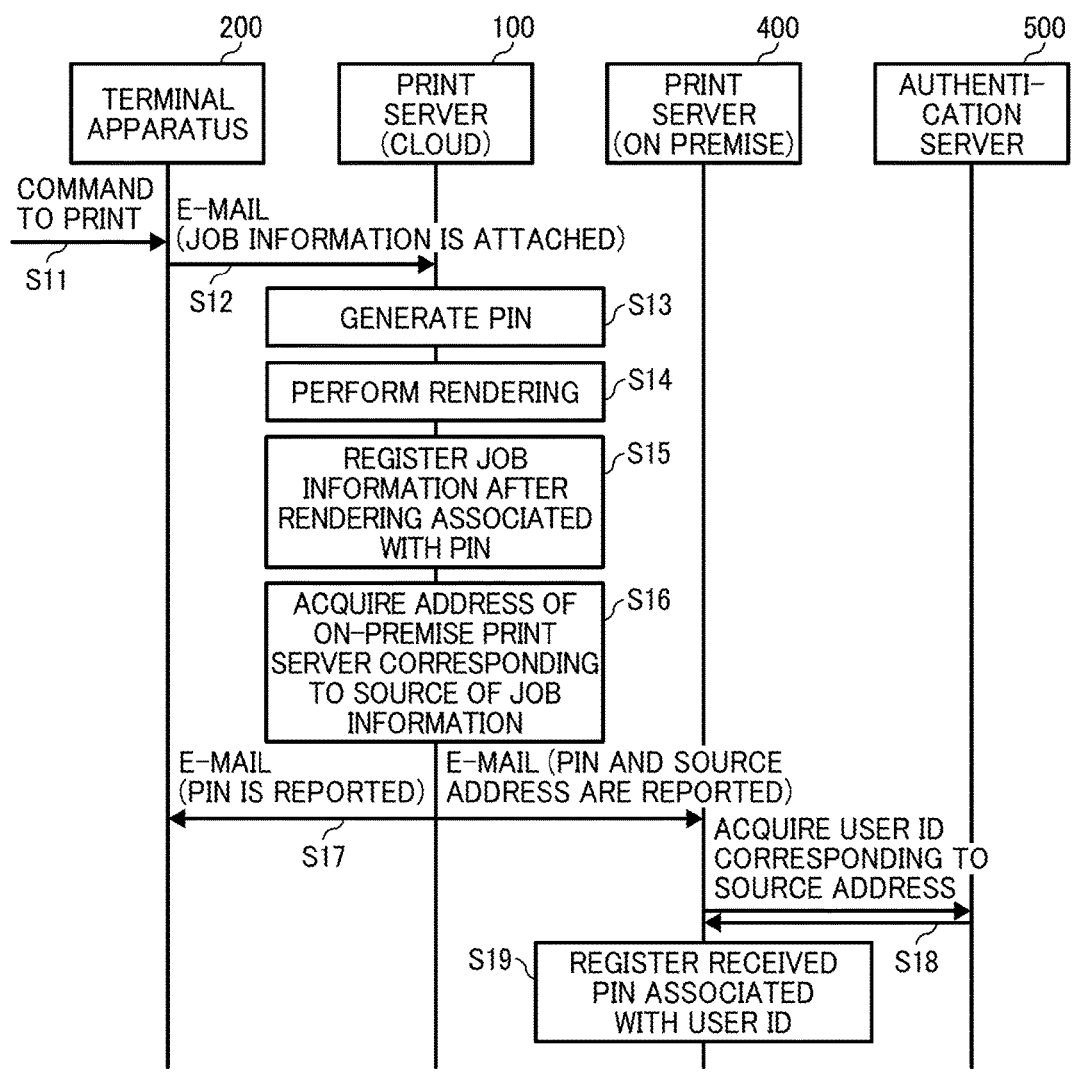
FIG. 5 is a diagram illustrating operation of registering the job information in the printer server, performed by the system of FIG. 1, according to an embodiment.

First, FIG. 5 is a diagram illustrating operations in registering the job information in the print server 100.

The operation in FIG. 5 starts after requesting the terminal apparatus 200 to perform printing using the print server 100 by user operation in S11. The request includes specifying a document to be printed, specifying print setting used for printing, and specifying the print server 100 in use, etc.

After receiving the request, the terminal apparatus 200 generates job information to control an image forming apparatus to perform printing as instructed by user operation and transfers e-mail attaching the job information to the print server 100 in S12. The operation corresponds to functions of the job generator 221 and the job information transmitter 222.

On the other hand, the print server 100 regularly monitors reception of e-mail. After receiving the e-mail that the job information is attached, the print server 100 generates PIN that corresponds to the job information in S13 and performs rendering on the job information in S14. These operations corresponds to functions of the job information receiver 121, the PIN generator 122, and the job information register 123.

Next, the print server 100 associates the rendered job information with the generated PIN to register in the job registration table 131 in S15. The operation corresponds to a function of the job information registration unit 123.

Furthermore, the print server 100 acquires an e-mail address of the on-premise print server 400 corresponding to the source e-mail address of the job information from the report destination table 132 in S16. Subsequently, e-mail reporting the PIN is transferred to the source of the job information and the print server 400 in S17. As a result, the source e-mail address of the job information is also reported to the print server 400. These operations are operations of transferring identification information and correspond to a function of the PIN reporter 124.

In addition, the print server 400 regularly accesses the e-mail server 700 and monitors reception of e-mail. Subsequently, after receiving the e-mail reporting the PIN, the print server 400 inquires of the authentication server 500 about the user ID corresponding to the source e-mail address of the job information included in the e-mail to acquire the user ID in S18. The operation is an operation of receiving and operation of acquiring identification information and corresponds to functions of the PIN receiver 421 and the user ID acquisition unit 422.

Subsequently, the print server 400 associates the PIN reported by the e-mail with the user ID acquired in S18 to register them in the PIN registration table 431 in S19, and the operation in FIG. 5 ends. The operation in S19 is a registration operation and corresponds to a function of the user ID acquisition unit 422.

As a result, it is possible to register the information that associates the authentication for specifying the user in the local environment N with the authentication for specifying the job information in the print server 100 in the cloud environment in the PIN registration table 431.

Next, FIG. 6 is a diagram illustrating operations in performing printing in accordance with the job information registered in FIG. 5 using the image forming apparatus 600 in the local environment N.

The operation in FIG. 6 starts after inputting the user ID and password as authentication information into the image forming apparatus 600 by the user who performs the print operation in S11 in FIG. 5 to log in the image forming apparatus 600 in S31.

After accepting the login operation, the image forming apparatus 600 transfers a request for authentication including the input authentication information to the print server 400 in S32. The operation corresponds to a function of the authentication requester 621.

The print sever 400 transfers the received request for authentication to the authentication server 500 in S33. In this case, if the input authentication information has been stored, the authentication server 500 returns a response indicating that the authentication succeeds to the print server 400 in S34. The print server 400 transfers the response to the image forming apparatus 600 as the source of the request for authentication in S35. After receiving the response indicating that the authentication succeeds, the image forming apparatus 600 allows the user to log in in S36. The operation described above corresponds to functions of the user authentication unit 423 and the user authentication unit 522.

After receiving the response indicating that the authentication succeeds in S34, the print server 400 searches through the PIN registration table 431 to acquire PIN corresponding to the user ID described in the request for authentication in S37 and transfers a request to refer to job including the PIN to the print server 100 in S38. The request to refer to job is a command that requests to transfer bibliographic information among job information.

In response to the request, the print server 100 transfers bibliographic information as a part of the job information registered in the job registration table 131 associated with the PIN included in the request to the print server 400 as the request source in S39. If multiple PINs are registered, the bibliographic information corresponding to the multiple jobs is transferred. After receiving the bibliographic information, based on the bibliographic information, the print server 400 generates data on a list of jobs that the user who logs in the image forming apparatus 600 may execute registered in the print server 100 and transfers the data to the image forming apparatus 600 in S40. The operation in steps S37 to S40 described above is an operation of providing job corresponding to functions of the job information acquisition unit 424, the job information transmitter 425, and the job information transmitter 125. It should be noted that it is possible that the print server 400 transfers the bibliographic information as is and the image forming apparatus 600 generates the list.

Either way, based on the data received in S40, the image forming apparatus 600 displays the list of executable jobs and accepts selecting a print job to be executed by user operation in S41.

FIG. 8 is a diagram illustrating a screen displaying the list.

In a job list screen 70 in FIG. 8 includes a list display part 71, a print button 72, and a cancel button 73 and is displayed on a touch panel of the image forming apparatus 600.

In the list display part 71, the list of print jobs registered in the print server 100 is displayed. In FIG. 8, file names, number of printed sheets, and date/time of registration are displayed among the bibliographic information. By referring to the information described above and touching a position of a job to be printed by user operation, it is possible to toggle a selected mode and an unselected mode.

The print button 72 is a button to command to execute printing the selected job and close the job list screen 70. The cancel button 73 is a button to close the job list screen 70 instead of executing printing.

In FIG. 6, it is requested to execute a print job by using the print button 72 in S42. In response to the request, the image forming apparatus 600 transfers a request to transfer job information to the print server 400 in S43. The request includes information specifying a job using a number in the list etc. The operation in steps S41 to S43 described above corresponds to a function of the job presenter 622.

After receiving the request in S43, the print server 400 transfers a request to transfer job information including a PIN of the specified job to the print server 100 in S44. The request to transfer job information is a command to request to transfer the entire job information.

In response to the request, the print server 100 transfers the job information registered in the job registration table 131 associated with the PIN included in the request to the print server 400 as the request source in S45. After receiving the job information, the print server 400 transfers the job information to the image forming apparatus 600 in S46.

Among the operations described above, the operation in S45 is an operation of transferring job and corresponds to a function of the job information transmitter 125.

After receiving the job information in S46, the image forming apparatus 600 executes printing in accordance with the job information in S47. After finishing printing, the image forming apparatus 600 transfers a notification of finishing job to the print server 400 in S48. The operation corresponds to a function of the job executor 623.

In addition, after receiving the notification of finishing job, the print server 400 transfers a notification of finishing including a PIN indicating the completed job to the print server 100 in S49. After receiving the notification, the print server 100 deletes the job information corresponding to the received PIN from the job registration table 131 in S50, and the operation in FIG. 6 ends.

It is unnecessary to delete the job information from the job registration table 131 just after finishing printing. This is because it is requested to execute the same print job later in some cases. In case of not deleting the job information immediately, for example, after a predetermined period of time (e.g., several days) elapses from the registration, the job information may be deleted using a batch processing during a time zone with light processing load such as nighttime etc. In this case, it is not always required to report that printing is finished to the print server.

By using the operation in FIG. 6 described above, the user may refer to the print job registered in the print server 100 in the cloud environment just by logging in the image forming apparatus 600 in the local environment N. In addition, just by selecting a print job to be printed and commanding to execute, it is possible to have the image forming apparatus 600 execute the print job.

Next, FIG. 7 is a diagram illustrating operations in performing printing in accordance with the job information registered in FIG. 5 using the image forming apparatus 300 outside the local environment N.

In FIG. 7, the operation starts after the user who commands to print in S11 in FIG. 5 subsequently commands the image forming apparatus 300 to print specifying the print server 100 and inputting a PIN in S61.

After detecting the command to print, the image forming apparatus 300 transfers a request to refer to job including the input PIN to the specified print server 100 in S62. In response to the request, the print server 100 transfers bibliographic information as a part of the job information registered in the job registration table 131 (i.e., information on the print job that the user commands to print) associated with the PIN included in the request to the print server 400 as the request source in S63.

Based on the data received in S63, the image forming apparatus 600 displays a screen of confirming contents including contents of the print job that the user commands to print to confirm whether or not it is possible to execute printing in S64. A format of the screen may be common to the job list screen 70 in FIG. 8.

In FIG. 8, it is requested to execute a print job on the screen of confirming contents in S65. In response to the request, the image forming apparatus 300 transfers a request to transfer job information including the same PIN as in S62 to the print server 100 in S66. In response to the request, the print server 100 transfers the job information registered in the job registration table 131 associated with the PIN included in the request to the image forming apparatus 600 as the request source in S67.

After receiving the job information, the image forming apparatus 600 executes printing in accordance with the job information in S68. After finishing printing, the image forming apparatus 600 transfers a notification of finishing job including the same PIN as in S66 to the print server 100 in S69. After receiving the notification of finishing, the print server 100 deletes the job information corresponding to the received PIN from the job registration table 131 in S70, and the operation in FIG. 8 ends.

Just like the case in FIG. 6, it is not always required to delete the notification of finishing and the job information just after finishing executing the job. Among the operations described above, the operation in S63 and S67 is an operation of transferring job and corresponds to a function of the job information transmitter 125. The operation in steps S62, S64, and S66 corresponds to a function of the job information acquisition unit 321. The operation in S68 corresponds to a function of the job executor 322.

By the operation in FIG. 8 described above, the user may execute the print job registered in the print server 100 in the cloud environment without being authenticated identifying the user by the image forming apparatus 300. If even a preliminarily unregistered user may use the image forming apparatus 600 in the local environment as a guest user etc., it is possible that the user executes the print job registered in the print server 100 by an operation just like the operation in FIG. 7. In this case, the print server 400 may intervene communication between the image forming apparatus 300 and the print server 100. Regarding printing inputting a PIN, it is possible to charge the printing different from the printing after authentication just like the case in FIG. 6.

In the embodiment described above, the specific configuration of the apparatuses, the specific sequence of the processes, the number and layout of apparatuses used in the embodiment, specific steps of the operations for each apparatus, the format of data used in the embodiment, and the contents of the jobs etc. are not limited to the above description.

For example, in the embodiments described above, if the authentication succeeds, the print server 400 first acquires the bibliographic information of the job from the print server 100 and transfers the bibliographic information to the image forming apparatus 600. After accepting the selection of the job to be executed, the entire job information of the job is acquired and transferred to the image forming apparatus 600. However, it is possible to acquire the entire job information from the print server 100 regarding all PINs registered associated with the user ID from the first. In this case, it is possible to transfer the entire job information to the image forming apparatus 600 before accepting the selection of the job to be executed. Otherwise, after accepting the selection of the job to be executed, it is possible to transfer the whole job information regarding a job to be executed only.

The same goes for the acquisition of the job information in the image forming apparatus 300. It is possible to acquire the entire job information at the step S62 in FIG. 7, and it is possible to delete the job information if it is requested that the job is not executed.

In the embodiments described above, there is one print server 100 in the cloud environment. However, it is possible to select one print server to use the print server among multiple print servers. In this case, as illustrated in Table 5, the print server 400 in the local environment may store the source address of the e-mail reporting the PIN associated with the PIN and user ID in the PIN registration table 431. In this case, when the job information is acquired from the print server in the cloud environment, it is possible to transfer the request to transfer job information to the request source preregistered associated with the source address. The request source is not limited to e-mail addresses, and it is possible that the request source corresponds to a uniform resource locater (URL) etc.

TABLE 5

| PIN | User ID | Source address |
|---|---|---|
| 12345 | User B | send@cloudservera.co.jp |
| 67891 | User A | send@cloudserverb.co.jp |
| . | . | . |
| . | . | . |
| . | . | . |
| 34567 | NULL | send@cloudservera.co.jp |

In the embodiments described above, the image forming apparatus 600 requests the print server 400 to perform authentication. However, it is possible to request the authentication server 500 to perform authentication directly. In this case, in accordance with success of user authentication, the image forming apparatus 600 or the authentication server 500 may report to the print server 400 that the authentication succeeds and the user ID of the authenticated user. Subsequently, the print server 400 uses the notification as a trigger to acquire the job information from the print server 100.

In the embodiments described above, e-mail is used for registering job information in the print server 100 and reporting PIN to the user and the print server 400 by the print server 100. However, other methods such as a command in a dedicated application etc. may be used. For example, the print server 400 regularly requests the print server 100 to perform communication. If the print server 400 transfers a response to the request including a notification to the print server 100 etc., it is possible to communicate with apparatuses inside the firewall 800 from outside the firewall 800. In this case, addresses indicating a source of the job information are not limited to e-mail addresses. However, since it is preferable to use addresses managed by the authentication server 500 associated with the user ID, e-mail addresses are useful in this regard. In addition, it is considered that communication using e-mail that may report e-mail address easily is useful.

In addition, regarding the registration of the report destination table 132, it is possible that a destination e-mail address is associated with not a domain name but an individual address for each user. In addition, destination e-mail addresses may be associated using other granularity such as associated with a group of addresses defined appropriately etc.

In addition, it is possible to distribute functions of each apparatus in the embodiments described above in multiple apparatuses to implement a function in one apparatus in FIG. 1 cooperating with each other. In addition, it is possible to set up an apparatus combining functions of multiple apparatuses illustrated in FIG. 1. For example, it is possible that any one of multiple image forming apparatuses 600 also functions as the print server 400.

In addition, in the embodiments described above, the job information is information on the print job executed by the image forming apparatus. However, the implementation is not limited to the case. For example, it is possible that image projection jobs projected by an image projector are handled in the same way. Otherwise, it is possible that jobs unrelated to an image are handled in the same way. It is also possible to choose and design an apparatus that executes jobs arbitrarily in accordance with contents of jobs to be executed.

In addition, apparatuses illustrated in FIG. 1 may be laid out arbitrarily, and it is not required that the print server 400 is located in the on-premise local environment. In addition, it is not required that the print server 100 is located in the cloud environment.

Programs in the embodiments of the present invention instruct the computer to control the hardware to implement the functions of any one of the print servers 100 and 400 or other apparatuses described in the embodiments.

It is possible to store these programs in the ROM or other nonvolatile storage media (e.g., flash memory and EEPROM etc.) included in the computer before shipment. However, it is possible to provide those programs by storing those programs in any non-volatile storage medium such as a memory card, CD, DVD, and Blu-ray disc to distribute those programs. By installing those programs stored in those recording media in the computer and executing those programs, it is possible to implement the operations described above.

Furthermore, it is also possible to download those programs from an external apparatus that includes the recording medium storing those programs or an external apparatus that stores those programs in a storage unit and install those programs in the computer to execute those programs.

In addition, configurations described in the above embodiments can be combined arbitrarily and implemented as long as they do not contradict with each other of course. Otherwise, configurations described in the above embodiments can be implemented picking up only a part of the configurations.

In the embodiments described above, systems that may cooperate a system that does not require user registration preliminarily with a system that allows only preregistered users to use the system to be used easily with a good operability are provided.

The present invention also encompasses a non-transitory recording medium storing a program that executes an information processing method, performed by an information processing system including a first information processing apparatus and a second information processing apparatus. The information processing method, performed by the information processing system, includes the steps of receiving, from the counterpart information processing apparatus, job identification information for identifying job information that controls an apparatus to perform a specific operation and address information indicating an address of a transmission source of the job information associated with the job identification information, acquiring, from a memory storing user association information, user identification information corresponding to the address indicated by the received address information, the user association information associating for each user an address and user identification information, registering the received job identification information associated with the acquired user identification information, transferring, in response to an inquiry with the user identification information from a source of inquiry, a request for transmission including the job identification information that is registered, to the counterpart information processing apparatus to cause the counterpart information processing apparatus to transfer the job information registered at the counterpart information processing apparatus in association with the job identification information, and providing at least a part of the job information registered in association with the job identification information that is received from the counterpart information processing apparatus, to a source of the inquiry.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

In the embodiments described above, a novel image forming apparatus that may reduce a burden on the administrator and deterring users from transferring information to the other apparatus is provided.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system, comprising:
a first information processing apparatus provided on a first network; and
a second information processing apparatus provided on a second network,
wherein the first information processing apparatus includes
first circuitry to register, in response to receiving job information that controls an apparatus to perform a specific operation, the job information in association with job identification information, and
a first transmitter to
transfer the job identification information respectively to a transmission source of the job information having a transmission source address and a predetermined destination associated with the transmission source address, and
transfer the transmission source address to the predetermined destination, and wherein the second information processing apparatus, being the predetermined destination, includes
a receiver to receive, from the first information processing apparatus, the job identification information and the transmission source address,
second circuitry to
acquire, from a memory storing user association information, user identification information corresponding to the transmission source address, the user association information associating for each user an address and user identification information, and
register the job identification information received by the receiver in association with the acquired user identification information, and
a second transmitter to
transfer, in response to an inquiry including the user identification information from a source of inquiry, a request for transmission including the registered job identification information, to the first information processing apparatus to cause the first information processing apparatus to transfer the job information registered at the first information processing apparatus in association with the job identification information, and
provide at least a part of the job information registered in association with the job identification information that is received from the first information processing apparatus, to the source of the inquiry.

2. The information processing system according to claim 1, wherein
the receiver receives an e-mail including the job identification information, and
the second circuitry determines a destination of the request for transmission based on a transmission source of the received e-mail.

3. The information processing system according to claim 1, wherein the second information processing apparatus, being the predetermined destination, is located inside a firewall, and the firewall controls receiving data from the first network.

4. The information processing system according to claim 1, wherein the first transmitter of the first information processing apparatus transfers the job identification information using e-mails, respectively, addressed to the transmission source address and the predetermined destination.

5. The information processing system according to claim 3, wherein the first transmitter of the first information processing apparatus transfers the job identification information using e-mails, respectively, addressed to the transmission source address and the predetermined destination.

6. The information processing system according to claim 1, further comprising:
a third information processing apparatus including
third circuitry to
receive a print command from a user including the job identification information,
request the first information processing apparatus to provide the job information registered at the first information processing apparatus in association with the job identification information, and
provide at least a part of the job information registered in association with the job identification information that is received from the first information processing apparatus, to the user.

7. The information processing system according to claim 6, wherein
the second circuitry performs authentication using the user identification information and a password included in the inquiry.

8. The information processing system according to claim 6, wherein
the third circuitry does not perform authentication on the user.

9. The information processing system according to claim 6, wherein the first circuitry, the second circuitry and the third circuitry each include a processor or controller that executes stored instructions.

10. The information processing system according to claim 1, wherein the first information processing apparatus is a cloud server.

11. The information processing system according to claim 1, wherein the second transmitter provides a bibliographic data portion of the job information to the source of the inquiry.

12. The information processing system according to claim 11, wherein the second transmitter provides a remaining portion of the job information to the source of the inquiry in response to receiving a selection from the source of the inquiry.

13. The information processing system according to claim 1, wherein the job identification information is a personal identification number (PIN).

14. The information processing system according to claim 13, wherein the PIN is randomly generated.

15. The information processing system according to claim 1, wherein the first circuitry renders the job information such that the job information is converted into a format compatible with a specific image forming apparatus.

16. An information processing apparatus communicable with a counterpart information processing apparatus, the information processing apparatus comprising:
a receiver to receive, from the counterpart information processing apparatus, job identification information for identifying job information that controls an apparatus to perform a specific operation and a transmission source address corresponding to a transmission source of the job information associated with the job identification information;
circuitry to
acquire, from a memory storing user association information, user identification information corresponding to the transmission source address, the user association information associating for each user an address and user identification information, and
register the job identification information received by the receiver associated with the acquired user identification information; and
a transmitter to
transfer, in response to an inquiry including the user identification information from a source of inquiry, a request for transmission including the registered job identification information, to the counterpart information processing apparatus to cause the counterpart information processing apparatus to transfer the job information registered at the counterpart information processing apparatus in association with the job identification information, and
provide at least a part of the job information registered in association with the job identification information that is received from the counterpart information processing apparatus, to a source of the inquiry.

17. The information processing apparatus according to claim 16, wherein
the receiver receives an e-mail including the job identification information, and
the circuitry determines a destination of the request for transmission based on a transmission source of the received e-mail.

18. The information processing apparatus according to claim 16, wherein the circuitry includes a processor or controller that executes stored instructions.

19. A method of processing information performed by an information processing apparatus communicable with a counterpart information processing apparatus, the method comprising:
receiving, from the counterpart information processing apparatus, job identification information for identifying job information that controls an apparatus to perform a specific operation and a transmission source address corresponding to a transmission source of the job information associated with the job identification information;
acquiring, from a memory storing user association information, user identification information corresponding to the transmission source address, the user association information associating for each user an address and user identification information;
registering the received job identification information associated with the acquired user identification information;
transferring, in response to an inquiry including the user identification information from a source of inquiry, a request for transmission including the registered job identification information, to the counterpart information processing apparatus to cause the counterpart information processing apparatus to transfer the job information registered at the counterpart information processing apparatus in association with the job identification information; and
providing at least a part of the job information registered in association with the job identification information that is received from the counterpart information processing apparatus, to a source of the inquiry.

20. The method of processing information according to claim 19, wherein the receiving includes receiving an email including the job identification information, the method further comprising:
determining a destination of the request for transmission based on a transmission source of the e-mail received at the receiving.

* * * * *